United States Patent [19]

Martin

[11] 4,318,601
[45] Mar. 9, 1982

[54] FILM MAGAZINE
[75] Inventor: William A. Martin, Fairport, N.Y.
[73] Assignee: Eastman Kodak Company, Rochester, N.Y.
[21] Appl. No.: 212,924
[22] Filed: Dec. 4, 1980
[51] Int. Cl.³ .................. G03B 17/52; G03B 19/10
[52] U.S. Cl. .................................... 354/86; 354/180
[58] Field of Search .................................. 354/83–86, 354/180–182

[56] References Cited

U.S. PATENT DOCUMENTS 1,070,400  8/1913  Brieloff ............................ 354/180
4,236,798  12/1980  Sylvester ......................... 354/181

Primary Examiner—John Gonzales
Attorney, Agent, or Firm—M. S. Sales

[57] ABSTRACT

A film magazine, which is adapted to receive a stack of self-processing film units, is provided with a shuttle that reciprocates between a pair of pressure rollers to release the respective film units one at a time for movement into an exposure position, to engage and thereby support the released film unit for exposure, and to cause the exposed film unit to be removed from the exposure position between the rollers to initiate its processing. The shuttle is recessed at its leading end, and is thinner than the film units such that, upon rotation of the rollers, the respective dimensions of the shuttle and the film units will cause the rollers to: (1) engage the shuttle to initiate reciprocation of the shuttle until the film unit enters between the rollers, (2) disengage the shuttle and engage the film unit to advance the film unit between the rollers, and (3) when the film unit has passed entirely through the rollers, reengage the shuttle to continue its reciprocation.

6 Claims, 13 Drawing Figures

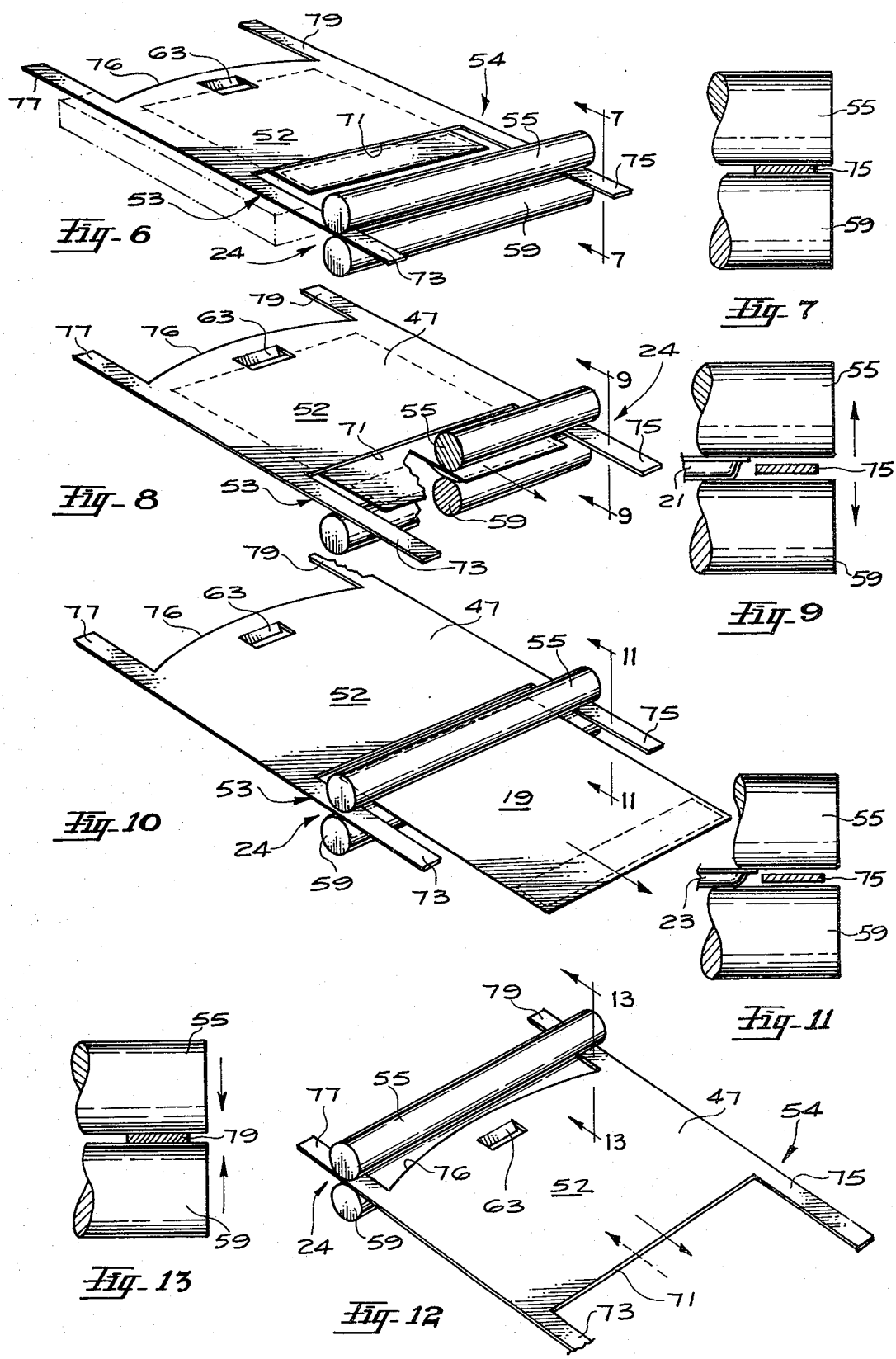

FILM MAGAZINE

BACKGROUND OF THE INVENTION

1. Field of the Invention

The present invention relates generally to a film magazine for sequentially presenting a plurality of film units to an exposure position, and more specifically to such a magazine having a shuttle that supports the film units for exposure and removes the exposed film units through a processing mechanism.

2. Brief Description of the Prior Art

It is well known to supply film units to cameras in multi-unit packs. The frequency with which the camera must be reloaded can be reduced by increasing the number of film units. However, this makes the pack larger and complicates the sequential positioning of the film units for exposure.

Packs that contain self-processing film units have both adavantages and disadvantages in this respect. Since many commercial self-processing film units can be processed in the daylight, the exposed film units need not be retained in the pack, but, instead, can be removed almost immediately from the camera. Therefore, it is possible to advance a stack of such film units so that successive units are located for exposure and then ejected from the camera through an exit slot. This approach is, in fact, employed in modern self-processing cameras which typically are adapted to receive packs of ten or fewer film units. When packs containing many more film units have been tried, problems have been encountered primarily because the film units are not uniform in caliper.

The lack of uniform caliper is a result of each film unit having a pouch of processing fluid at one end and a trap for excess fluid at the other end, each of which is thicker than the central, imaging section. When pressure is applied to it, the stack tends to collapse in the center and splay apart at the ends, making it difficult to both properly seat the forwardmost film unit for exposure and align it for movement through the exit slot. If increased pressures are employed in an attempt to properly seat the forwardmost film unit, the resulting frictional forces present substantial resistance to the removal of the units from the pack.

A solution to the above-mentioned problem is proposed in commonly-assigned copending U.S. patent application Ser. No. 084,474, entitled FILM PACK, filed on Oct. 15, 1979 in the name of Robert A. Sylvester, now U.S. Pat. No. 4,236,798. A shuttle plate is reciprocally mounted in the film pack. During exposure, the shuttle plate is positioned behind the forwardmost film unit to support it and to isolate the supported film unit from distorting forces transmitted through the other film units. After the exposure, lateral movement of the plate draws the supported film unit through a processing mechanism and exit slot.

The Sylvester approach provides for sequential movement of the film unit and shuttle so the shuttle moves with the film unit through the processing mechanism. The present invention is an improvement over Sylvester in that, instead of moving with the film unit through the mechanism, the shuttle follows the film unit.

SUMMARY OF THE INVENTION

In accordance with the present invention, a film magazine, which is adapted to receive a stack of self-processing film units, is provided with a reciprocally mounted shuttle for supporting one film unit at a time in an exposure position, and for indexing the exposed film unit through a processing mechanism. In response to the entry of the film unit into the processing mechanism, further movement of the shuttle is interrupted while the film unit movement continues. The shuttle then follows the film unit through the mechanism.

In a preferred embodiment of the invention, the shuttle is thinner than the individual film units. The processing mechanism comprises a pair of rotatable pressure rollers such that when the rollers close together, they first engage the shuttle and drive it until the film unit enters the rollers. The separation between the rollers is increased by the thickness of the film unit entering the rollers, causing an interruption in shuttle movement until the film unit clears the rollers.

The invention, and its objects and advantages, will become more apparent from the detailed description of the preferred embodiment presented below.

BRIEF DESCRIPTION OF THE DRAWINGS

In the detailed description of the preferred embodiment of the invention presented below, reference is made to the accompanying drawings, in which:

FIGS. 6 through 13 are schematic views of the shuttle of the preferred embodiment of the magazine in various stages of operation to advance a film unit through the processing mechanism and initiate processing of the film unit.

DETAILED DESCRIPTION OF THE PREFERRED EMBODIMENT

Figure 1:
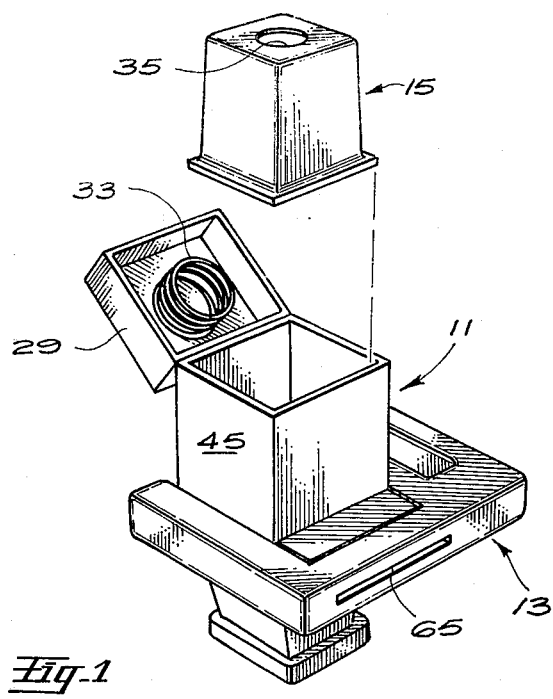
FIG. 1 is a perspective view of a camera having a magazine in accordance with a preferred embodiment of the present invention, and a cartridge containing a stack of film units adapted to be received in the magazine.
Figure 2:
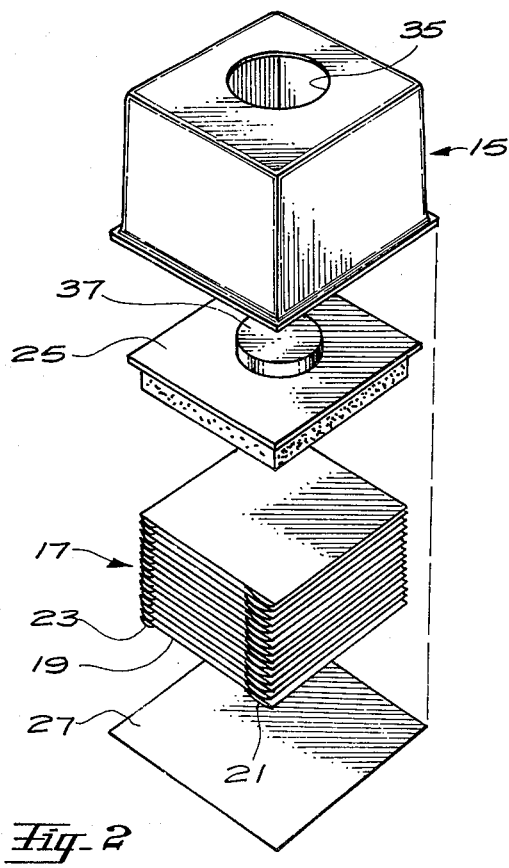
FIG. 2 is a view in exploded perspective of the cartridge depicted in FIG. 1 including a stack of self-processing film units.

Referring now to the drawings, and beginning with FIGS. 1-5, a preferred embodiment of the invention includes a film magazine 11 in a camera 13. The magazine is part of the camera, and is adapted to receive a separate cartridge 15 which contains a stack 17 of film units. The magazine could however be formed by the cartridge itself or by the interface between the cartridge and the camera.

The illustrated film units are conventional self-processing film units having an imaging section 19 (FIG. 4) located between a pouch 21 of processing fluid and a trap 23 for receiving any excess fluid. Each film unit is adapted to be processed in a manner well known in the art by advancing the film unit through a processing mechanism, such as depicted at 24, which ruptures the pouch and distributes its fluid contents across the imaging section toward the trap. The distributed fluid permeates the imaging section and brings about the development of the exposed image to establish a full color reflection print.

The individual film units are accumulated in stack 17 in cartridge 15 between a pressure plate 25 (FIG. 2) and a cartridge covering membrane 27. The cartridge, pressure plate and membrane provide a dark chamber for the film units that permits loading of the camera in daylight and facilitates the handling of a large number of film units. In addition, the pressure plate is adapted to operate with suitable camera mechanisms to sequentially advance the film units from the cartridge for successive exposures.

The film units are loaded into camera 13 by opening camera door 29 (FIG. 1) and inserting film cartridge 15 into magazine 11. When the door is closed, a rectangular blade 31 (FIG. 3) at the bottom of the magazine cuts away cartridge covering membrane 27 and releases the film units. A spring 33, located in the camera door, extends through an aperture 35 (FIG. 2) in the top wall of the cartridge and encircles a boss 37 on the pressure plate. The boss stabilizes the spring while the spring acts through the pressure plate to advance the film units from the cartridge. Thus, as each respective film unit is exposed and removed from the stack for processing, the next film unit is advanced by the spring into the location vacated by the preceding unit.

Figure 3:
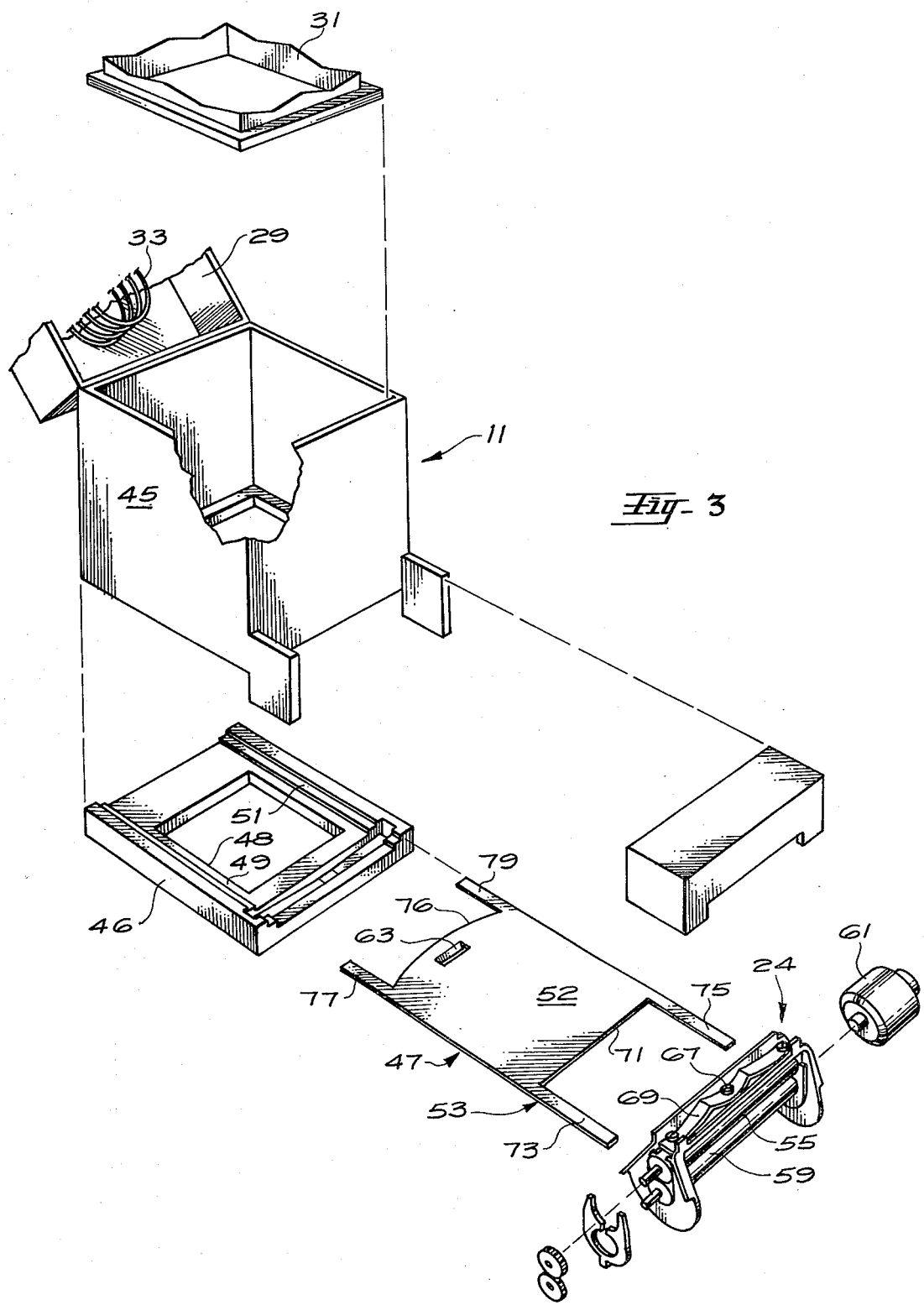
FIG. 3 is a view in exploded perspective of the film magazine in accordance with the preferred embodiment and of a processing mechanism including a pair of pressure rollers.
Figure 4:
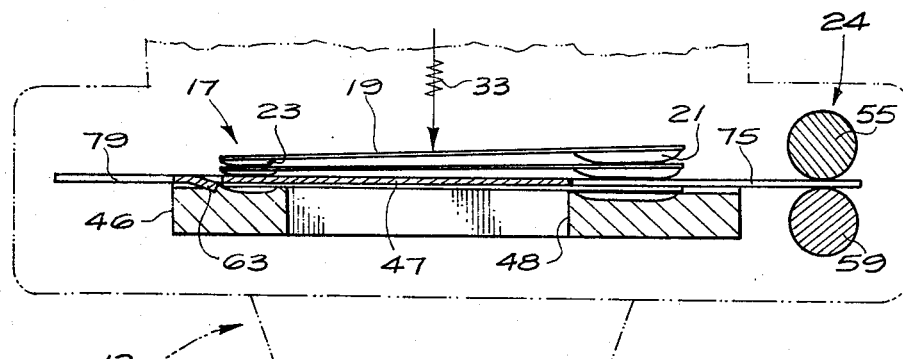
FIGS. 4 and 5 are cross sectional and perspective views, respectively, of a portion of the film magazine in accordance with the preferred embodiment showing the shuttle in more detail in its film supporting position.
Figure 5:
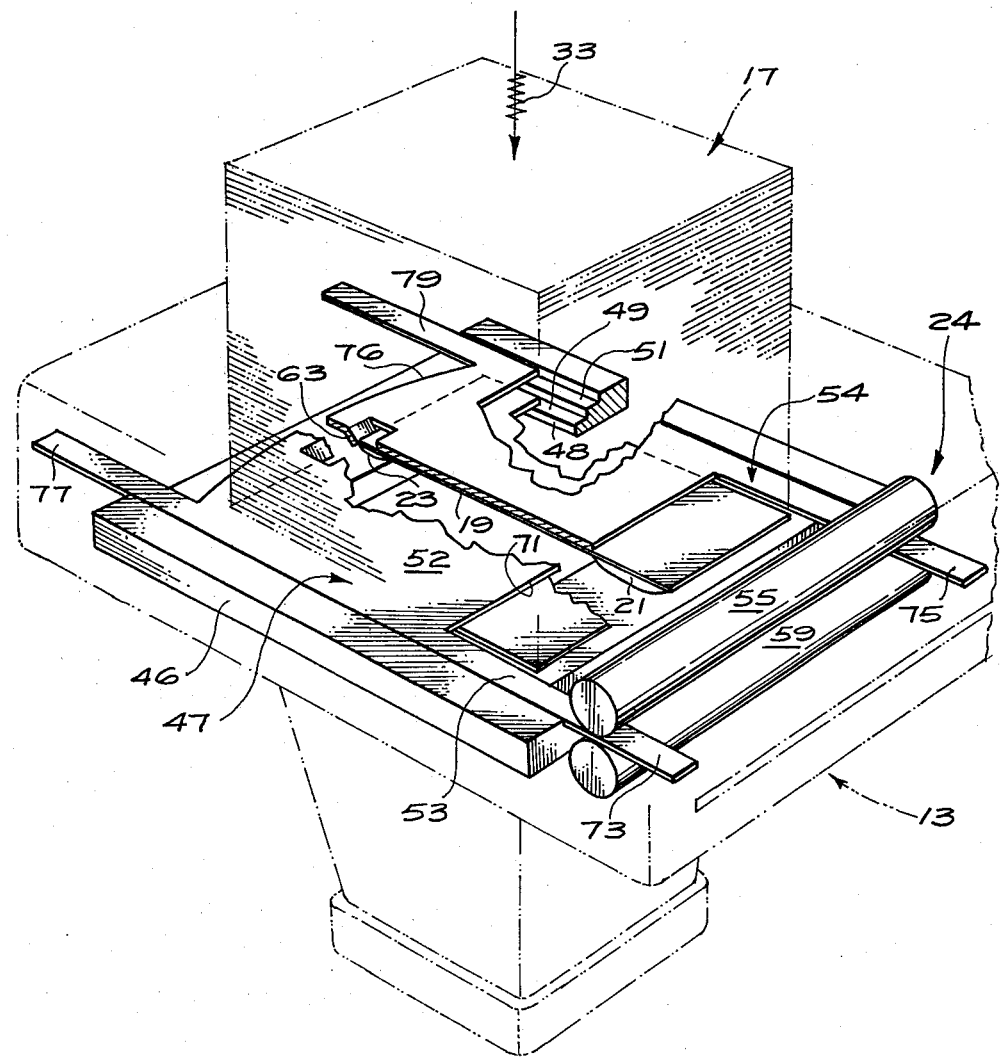

The magazine controls the sequential movement of the film units from the cartridge into the camera exposure position and then through the processing mechanism. Referring to FIGS. 3-5, the magazine comprises a generally rectangular housing 45 and a frame 46 which slidably carries a shuttle 47. Housing 45 receives cartridge 15 containing the film unit stack and advances the stack so that successive film units become available for exposure as the preceeding film units are removed for processing.

Frame 46 has a number of structural features for affecting related functions. Such features include a rectangular exposure aperture 48 through which the successive film units are adapted to be exposed, a first land 49 which extends around the aperture to establish the film plane in the exposure position, and a second land 51 which extends on opposite sides of the aperture to provide a guide channel for the shuttle.

Shuttle 47 is a generally flat plate including a body portion 52 connecting first and second edge rails 53 and 54, respectively. The shuttle is adapted to reciprocate in the guide channel to permit one film unit at a time to drop from the cartridge side of the shuttle into the film exposure plane in engagement with first land 49. The shuttle is then driven by a motor 61 to re-enter the stack between that film unit and the next successive film unit. In this position of the shuttle, its main body portion supports the forwardmost film unit in the exposure plane and isolates it from distorting forces that otherwise might be transferred through the stack. Additionally, since the shuttle serves to confine the forwardmost film unit in the exposure plane, this function is not required of spring 33 or pressure plate 25, which can instead be optimized for their more immediate purposes already mentioned.

Shuttle 47 is particularly adapted for use with a processing mechanism which comprises a pair of pressure rollers 55 and 59 that are rotatably driven by an aforementioned reversible motor 61. When the shuttle is reciprocated, a lug 63 adjacent the trailing end of the shuttle engages the film unit and moves it between the rollers, which drive the film unit through exit slot 65 (FIG. 1) while at the same time rupturing the pouch 21 and distributing its contents across the imaging area. The pressure exerted on the film unit by the rollers is set during the manufacture of the camera by an adjusting screw 67, (FIG. 3) which acts through a beryllium copper spring 69 to exert a force against roller 55.

As depicted in FIGS. 6 and 7, body portion 52 of the shuttle supports the film unit with the pod end of the film unit extending between tabs 73 and 75 beyond leading edge 71 of the shuttle. Lug 63 engages the trailing end of the film unit, and rollers 55 and 59 are in driving engagement with shuttle tabs 73 and 75.

After the film unit is exposed, motor 61 is actuated to rotate the rollers 55 and 59 in driving engagement with the shuttle tabs 73 and 75, advancing the shuttle and the film unit together until the pod end of the film unit enters the roller nip. At this point, and as depicted in FIGS. 8 and 9, the thickness of the film unit forces the rollers apart against the bias of spring 69, disengaging them from driving engagement with the shuttle and interrupting the movement of the shuttle through the rollers. The film unit is then in driving engagement with the rollers as depicted in FIGS. 10 and 11 and continues to move therebetween to rupture pouch 21 and distribute the processing fluid across the imaging area, thereby initiating processing of the film unit.

After the film unit clears the rollers, they move together again into driving engagement with the shuttle, driving the shuttle in the same direction as the film unit until trailing edge 76 clears the film unit stack (FIGS. 12 and 13). The direction of rotation of the rollers is then reversed by the camera and the shuttle is returned for repositioning in the stack behind the next successive film unit.

The shuttle is a relatively simple device that sequentially supports each successive film unit in an exposure plane, and transports the supported film unit into the nip between a pair of pressure rollers, but its movement is then interrupted while the film unit moves through the rollers before the shuttle continues its reciprocation into its supporting position behind the next successive film unit. Moreover, this sequence of movements of the film unit and shuttle is accomplished automatically by the relative dimensions of the respective parts without adding significantly to the overall complexity of the magazine. Film cartridges containing large numbers of self-processing film units can be employed without loss of accuracy in locating the respective film units in the proper exposure plane and without increasing transport forces necessary to remove the film units from the magazine.

Although the invention has been described with particular reference to a preferred embodiment thereof, it will be readily understood that variations and modifications can be effected within the spirit and scope of the invention as described hereinabove and as defined in the appended claims.

I claim:

1. In a magazine for receiving a stack of photographic film units, and including a shuttle adapted to reciprocate to successively: (a) release successive film units from the stack for movement into an exposure position, (b) support the released film units for exposure, and (c) remove the exposed film units from the exposure position and move them into a processing mechanism which includes means for advancing the film units through the mechanism, the improvement comprising:

means responsive to the entry of the film unit into the processing mechanism for interrupting reciprocation of the shuttle until the film unit has moved through the mechanism.

2. In a magazine for receiving a stack of photographic film units, and including a shuttle adapted to reciprocate to successively release successive film units for movement into an exposure position, support the released film unit for exposure, and to remove the exposed film unit from the exposure position into the nip between a pair of rollers rotatable to drive the film units between the rollers to initiate processing of the film units, the improvement comprising:

means operative when a film unit is between the rollers for interrupting reciprocation of the shuttle.

3. In a film magazine for receiving a stack of film units processable by moving the film units longitudinally through a pressure nip, the magazine including a shuttle reciprocatable through the nip successively (1) control the movement of the respective film units into an exposure position, (2) engage and thereby support the film units for exposure, and (3) cause the exposed film units to be removed through the pressure nip to initiate processing of such film units; the improvement wherein:

the shuttle includes a main body portion adapted to engage the film unit in the exposure position and having a leading edge which is spaced farther from the pressure nip than the closest end of the film unit, such that, upon reciprocation of the shuttle to cause the film unit to move into the pressure nip, the supported film unit will enter the pressure nip before said main body portion of the shuttle.

4. The film magazine improvement set forth in claim 3, wherein said shuttle includes at least one tab which extends from said leading edge of said main body portion into driving engagement with the pressure nip, and said shuttle is thinner than the supported film unit, such that rotation of the pressure nip in engagement with the tab will initiate reciprocation of said shuttle and advance the supported film unit until it enters the pressure nip, and then the thickness of the film unit which has entered the nip will disengage the pressure nip from driving engagement with the tab.

5. A film magazine improvement as set forth in claim 4 wherein said shuttle includes two tabs spaced transversely on opposite sides of the main body portion and extending from the main body portion of the shuttle into the pressure nip.

6. In a film magazine including a chamber for receiving a stack of film units processable by moving the film units longitudinally between two rotatable pressure rollers, and a shuttle reciprocatable between the rollers to successively (1) position the shuttle in the stack in engagement with one of the film units to support that film unit for exposure, (2) cause the engaged film unit to move into the rollers and (3) reposition the shuttle in the stack to support another one of the film units for exposure; the improvement wherein:

the shuttle is recessed to provide (1) a leading edge which, when the shuttle is in its film supporting position, extends in the stack between the supported film unit and the other film unit, and (2) two tabs which are spaced apart on opposite sides of the supported film unit and extend between the rollers, said tabs having a thickness which is less than the thickness of the film unit, whereby upon rotation of the rollers engagement between the rollers and the tabs will move the shuttle and with it the supported film unit until the film unit enters between the rollers whereupon the thickness of the film unit will cause disenage of the rollers from driving engagement with the shuttle, and rotation of the rollers will advance the film unit between the rollers before said leading edge of the shuttle enters between the rollers.

* * * * *